Jan. 17, 1956 B. WIESEN 2,731,511
COLOR TELEVISION SYSTEMS
Filed Nov. 28, 1950

INVENTOR.
BERNARD WIESEN
BY Leon M. Strauss
AGT.

United States Patent Office 2,731,511

Patented Jan. 17, 1956

2,731,511

COLOR TELEVISION SYSTEMS

Bernard Wiesen, New York, N. Y.

Application November 28, 1950, Serial No. 197,899

2 Claims. (Cl. 178—5.4)

My invention relates to color television systems, more particularly to systems utilizing synchronized rotating filter disks at the transmitting and at the receiving end.

In conventional systems of this type it has been the practice to dispose the filter disk at the receiver between the fluorescent screen of the cathode ray tube and either the eye of the observer or some secondary screen surface upon which the image is projected to be viewed. The various segments of the filter disk, generally of blue-violet, green and orange-red color, respectively, selectively suppress part of the light rays coming from the picture tube screen by allowing only the components corresponding to their own color to pass; this process, accordingly, cuts down the average brightness of the resulting image to a fraction of its value ahead of the filter. Since, moreover, the light passing through the filter is derived from the luminous spot of a cathode ray tube which in itself is not a source of high luminosity, the reproduction of sufficiently bright color pictures has been difficult to achieve with equipment of the type referred to.

It is, accordingly, an object of my invention to provide means affording the increase of the brightness of color pictures obtainable by the synchronized-filter process of television transmission.

A further object of this invention is to provide means external of a conventional television receiver for converting the latter, by a simple manipulation, from black-and-white to color reception or vice versa.

A more specific object, allied with the preceding one, is to provide means for converting the receiver from black-and-white to color reception, or vice versa, without interference with any critically adjusted parts (such as, for example, the color disk).

The invention makes use of the fact that the beam of a cathode ray tube, upon impinging on the fluorescent screen thereof, not only causes the area of impingement to light up but also, in so doing, changes the color thereof from a grayish hue to approximately white, thereby giving actually the impression of a black-and-white rather than merely a dark-and-light image. Accordingly, it becomes possible through illumination with a suitable monochromatic light to convert the "white" areas into areas of a desired color without noticeably affecting the remaining or "black" areas. A feature of the invention, therefore, consists in successively receiving black-and-white pictures corresponding, respectively, to different color components of the object to be televised (generally the three primary colors of the visible spectrum) and to illuminate each picture so received with light of the corresponding color taken from an external source, the rapid cyclic succession of these pictures giving a visual impression of a multicolor picture in which the object appears substantially in its natural colors.

According to another feature of the invention, the differently colored light used to illuminate successive pictures (or "frames") is taken from a single external source of polychrome (e. g. white) light, the rays of said source passing through a rotating color filter synchronized with a similar filter conventionally provided at the transmitter.

The above and other objects and features will become apparent from the following detailed description, reference being had to the accompanying drawing in which.

Figures 1, 2:
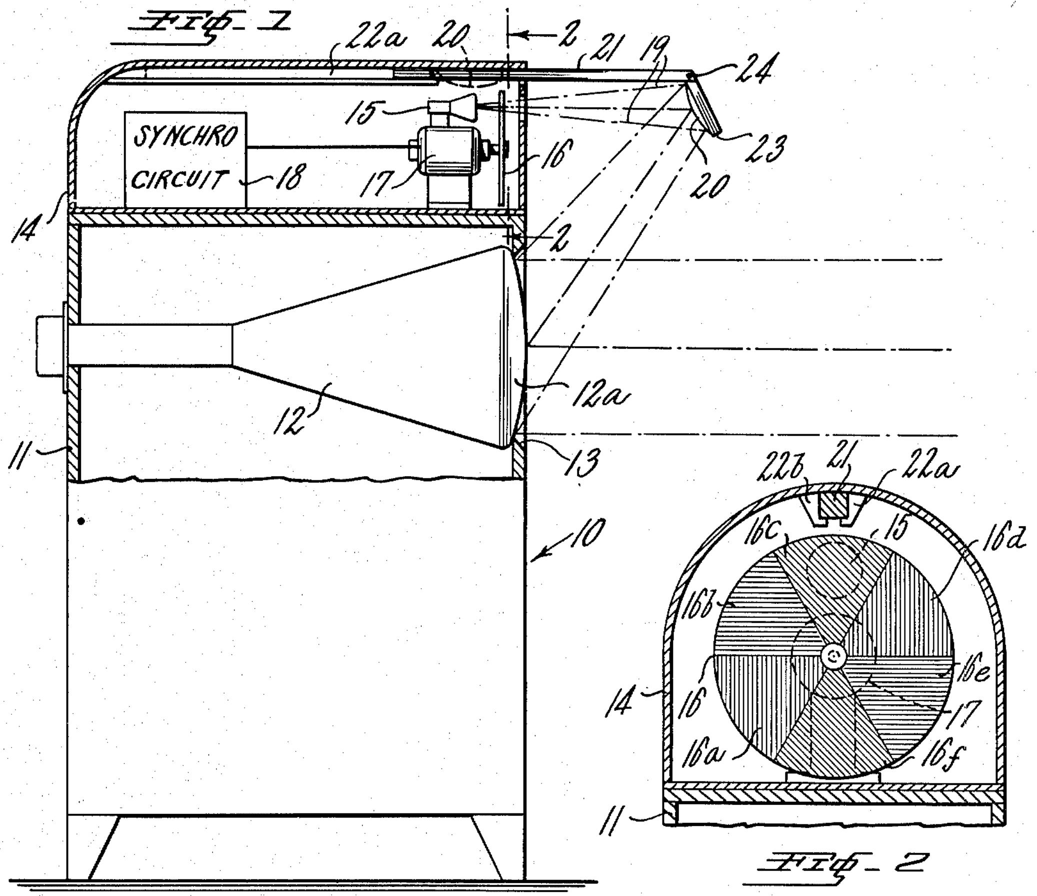
Fig. 1 is a side elevation, partly in section, of a color television receiver according to the invention.
Fig. 2 is a fragmentary section taken on the line 2—2 of Fig. 1.

Referring now to Figs. 1 and 2 of the drawing, there is disclosed a conventional television receiver 10 comprising a console or cabinet 11, the lower part of which houses the usual transformers, tuned circuits, amplifier tubes and other auxiliary equipment (not shown), and a cathode ray tube 12 mounted in the upper part of the cabinet 11. This part of the cabinet is provided with a window 13 through which the front end 12a of the fluorescent screen of tube 12 is visible.

Mounted on top of the console 11 is a half-round casing 14 containing an auxiliary source of light 15, a filter disk 16, and a motor 17 controlled by a synchronizing circuit 18 for rotating the disk 16 in step with a similar disk provided at the transmitter (not shown). The disk 16 is divided into six sectors, designated *16a*, *16b*, *16c*, *16d*, *16e* and *16f*, any three successive ones of which represent, respectively, the three primary colors of the spectrum. Thus the sectors *16a*, *16d* may be orange-red (often briefly described as "red"), the sectors *16b*, *16e* green and the sectors *16c*, *16f* blue-violet (often simply called "blue"). The source 15 produces a steady strong spot light in the form of a conical beam 19 which is reflected by a mirror 20 upon the screen end of the cathode ray tube 12, the beam passing through the window 13 to reach the screen or front end of said tube.

The mirror 20 is supported on a movable arm 21, of rectangular cross section as seen in Fig. 2, which is slidably held by two guide rails *22a*, *22b*. The frame 23 of the mirror is pivotally secured to the arm 21 at joint 24, so as to be tiltable outwardly and enabling the arm 21 to be completely retracted into the casing 14, as shown in dotted lines in Fig. 1. It will thus be apparent that the mirror 20 may be placed in an operative position, as shown in full lines in Fig. 1, in which the unmodulated beam 19 will be continuously projected upon the screen portion 12a of the cathode ray tube 12, the color of this beam changing cyclically through red, green and blue as successive fields or frames corresponding to these three primary colors, respectively, are received. A picture in natural colors will thus be visible to an observer looking through the window 13 upon the screen surface 12a. When the mirror is retracted or otherwise displaced from its operative position, the pictures will be visible in black-and-white.

Figure 3:
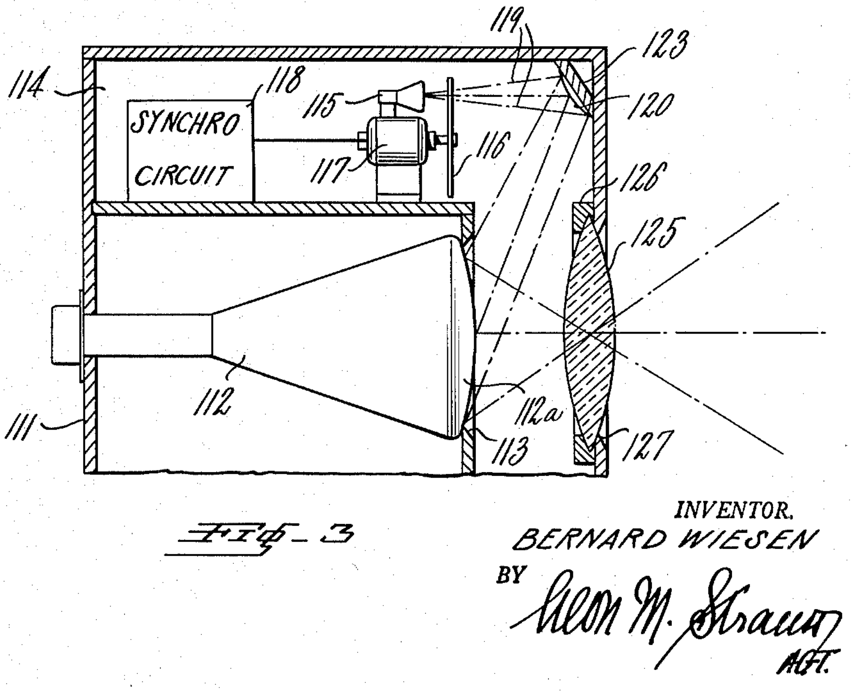
Fig. 3 is a side elevation similar to the upper half of Fig. 1, showing the receiver in somewhat modified form.

In the embodiment shown in Fig. 3, the console of the television receiver 110 comprises an inner compartment 111 and an outer compartment 114. Compartment 111 houses the picture tube 112 and is provided with a window 113 registering with the screen portion *112a* thereof; compartment 114 contains the motor 117 with the disk 116, the synchronizing circuit 18 therefor, and the reflector light 115 producing the conical beam 119. Mounted on a slanting bracket 123 inside the compartment 114, in the path of the beam 119, is the mirror 120 directing this beam through the window 113 upon the screen portion *112a*. A magnifying lens 125, held in a frame 126, is positioned in the compartment 114 adjacent a cutout 127 thereof which registers with the window 113.

The operation of the system of Fig. 3 is essentially the same as that described above, except that the mirror 120 is preferably immovably positioned within the receiver cabinet 110. It will be understood, of course, that the lens 125 may also serve to project the colored picture thus produced upon an external screen (not shown) instead of being merely used as a magnifier.

It is further contemplated according to the invention to employ a screen for the purpose of reproducing the colored picture, instead of lens 125 or to place such screen intermediate screen portion 112*a* and mirror 120 so that such screen reproduces the black and white picture on one face and the colored picture on the opposite or front face of such screen.

Although two specific embodiments of the invention have been described and shown in the drawing, it should be noted that the invention may be realized in modified form and adaptations of the arrangements herein disclosed may be made as may readily occur to persons skilled in the art without constituting a departure from the spirit and scope of the invention as defined in the objects and in the appended claims.

Having thus described the invention, what is claimed as new and desired to be secured by Letters Patent, is:

1. In a television receiver, in combination, a cathode ray tube including a fluorescent screen having an outer surface and an inner surface on which normally black and white pictures are reproduced, a source of polychrome light positioned remote from said cathode ray tube, movable optical means for directing light from said light source over a predetermined path onto said outer surface of said fluorescent screen, a rotatable filter in said path having portions of different color transmission, and control means rotating said filter, thereby successively placing respective ones of said portions in said path, said optical means comprising a mirror normally positioned forwardly of said rotatable filter and said fluorescent screen, said mirror being movable for placement rearwardly of said filter to interrupt impingement of said light upon said screen.

2. In a television receiver, the combination according to claim 1, comprising a cabinet having said cathode ray tube mounted therein and provided with a window adjacent said fluorescent screen thereof, said mirror being positioned externally of said cabinet and directing said light through said window.

References Cited in the file of this patent

UNITED STATES PATENTS

| | | |
|---|---|---|
| 2,191,515 | Von Bronk | Feb. 27, 1940 |
| 2,343,971 | Goldsmith | Mar. 14, 1944 |
| 2,378,746 | Beers | June 19, 1945 |
| 2,579,971 | Schade | Dec. 25, 1951 |
| 2,611,817 | Schwarz | Sept. 23, 1952 |
| 2,623,109 | Bell | Dec. 23, 1952 |